(12) United States Patent
Dumanois et al.

(10) Patent No.: US 11,425,561 B2
(45) Date of Patent: Aug. 23, 2022

(54) ACCESS TO A SERVICE WITH AUTHENTICATION BASED ON A MOBILE TERMINAL

(71) Applicant: ORANGE, Issy-les-Moulineaux (FR)

(72) Inventors: Antoine Dumanois, Chatillon (FR); Charles Marais, Chatillon (FR); Philippe Lucas, Chatillon (FR); Christine Lemoine, Chatillon (FR); Serge Llorente, Chatillon (FR)

(73) Assignee: ORANGE, Issy-les-Moulineaux (FR)

( * ) Notice: Subject to any disclaimer, the term of this patent is extended or adjusted under 35 U.S.C. 154(b) by 128 days.

(21) Appl. No.: 16/647,288

(22) PCT Filed: Sep. 13, 2018

(86) PCT No.: PCT/FR2018/052240
§ 371 (c)(1),
(2) Date: Mar. 13, 2020

(87) PCT Pub. No.: WO2019/053376
PCT Pub. Date: Mar. 21, 2019

(65) Prior Publication Data
US 2020/0221300 A1 Jul. 9, 2020

(30) Foreign Application Priority Data

Sep. 15, 2017 (FR) ........................ 1758586
Nov. 28, 2017 (FR) ........................ 1761293

(51) Int. Cl.
*H04W 12/06* (2021.01)
*H04L 9/40* (2022.01)
(52) U.S. Cl.
CPC ............. *H04W 12/06* (2013.01); *H04L 63/08* (2013.01)

(58) Field of Classification Search
CPC . H04L 63/08; H04L 63/0815; H04L 63/0838; H04L 12/06
(Continued)

(56) References Cited

U.S. PATENT DOCUMENTS 7,542,569 B1 * 6/2009 Leiwo ................... H04W 12/06
713/180
2012/0317261 A1 12/2012 Ahmavaara
(Continued)

FOREIGN PATENT DOCUMENTS

FR 3032847 A1 8/2016

OTHER PUBLICATIONS

International Search Report dated Nov. 30, 2018 for corresponding International Application No. PCT/FR2018/052240, filed Nov. 30, 2018.
(Continued)

*Primary Examiner* — Benjamin A Kaplan
(74) *Attorney, Agent, or Firm* — David D. Brush; Westman, Champlin & Koehler, P.A.

(57) ABSTRACT

A method for accessing a service supplied on a mobile terminal by an application server contributing to supplying the service. The method is implemented by the mobile terminal and includes: transmitting a request having a subscriber identifier of a subscriber of a subscription with a mobile operator, the subscriber identifier being based on a piece of information supplied by a security module of the mobile terminal, and inserted in the request without intervention of the user; receiving a response including an identification code relating to the subscriber identifier; transmitting an authentication request Including the identification code, the request being transmitted to an authentication server of the mobile operator; receiving an authentication response including an authentication code relating to the
(Continued)

Figure 1:
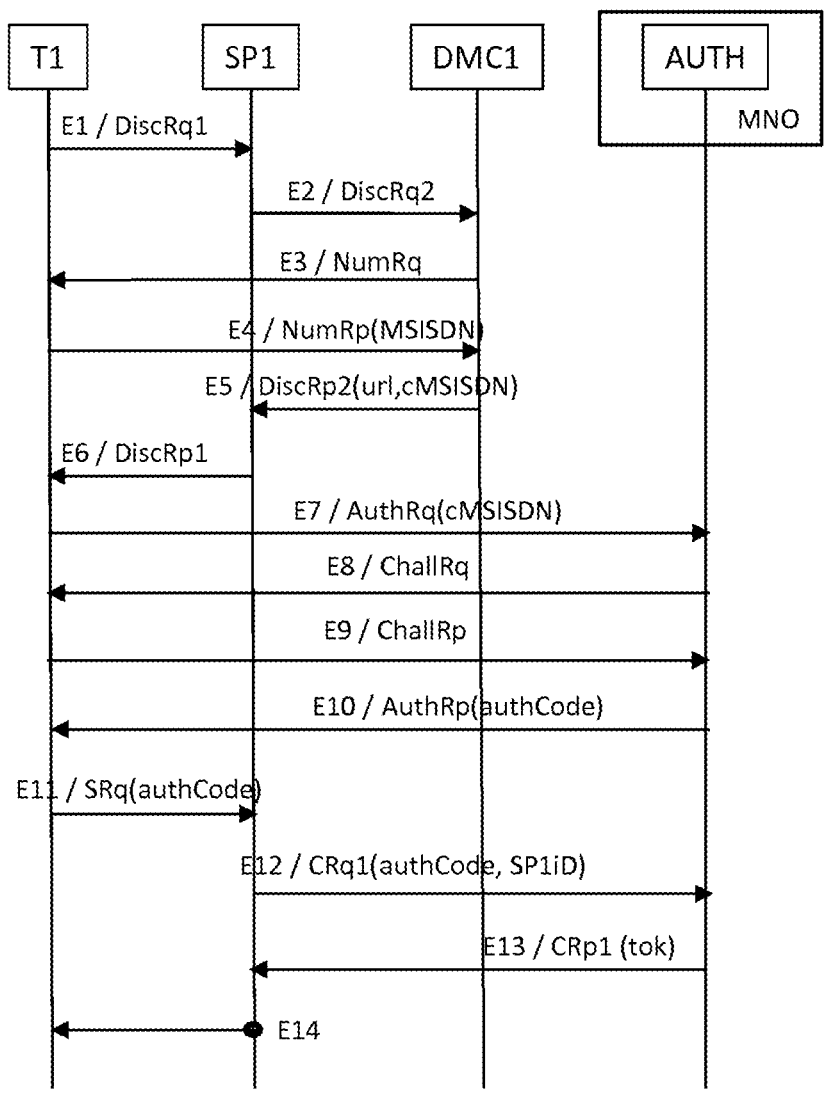

identification code; and transmitting a service access request including the authentication code to the application server.

10 Claims, 4 Drawing Sheets

(58) Field of Classification Search
  USPC .............................................................. 726/7
  See application file for complete search history.

(56) References Cited

U.S. PATENT DOCUMENTS

| | | |
|---|---|---|
| 2015/0040154 A1 | 2/2015 | Mildner et al. |
| 2015/0067667 A1* | 3/2015 | Chan ........................ H04L 63/08 |
| | | 717/169 |
| 2016/0055322 A1* | 2/2016 | Thomas .............. H04L 63/0876 |
| | | 726/7 |
| 2018/0034809 A1 | 2/2018 | Lavedrine et al. |
| 2021/0014060 A1* | 1/2021 | Georgiadis ........... G06Q 50/184 |

OTHER PUBLICATIONS

Written Opinion of the International Searching Authority dated Nov. 30, 2018 for corresponding International Application No. PCT/FR2018/052240, filed Nov. 30, 2018.

V0 Gsm Association et al., "Mobile Connect MNO Implementation Requirements Mobile Connect MNO Implementation Requirements Version 0.1 [Publication Date] Security Classification: Non-Confidential Official Document PDATA.10—Mobile Connect MNO Implementation Requirements", Jan. 1, 2015 (Jan. 1, 2016), pp. 1-27, XP055370156.

English translation of the Written Opinion of the International Searching Authority dated Dec. 10, 2018 for corresponding International Application No. PCT/FR2018/052240, filed Nov. 30, 2018.

* cited by examiner

ACCESS TO A SERVICE WITH AUTHENTICATION BASED ON A MOBILE TERMINAL

CROSS-REFERENCE TO RELATED APPLICATIONS

This Application is a Section 371 National Stage Application of International Application No. PCT/FR2018/052240, filed Sep. 13, 2018, which is incorporated by reference in its entirety and published as WO 2019/053376 A1 on Mar. 21, 2019, not in English.

1. FIELD OF THE INVENTION

The invention lies in the field of authenticating a user wishing to access a service provided via the Internet, and more particularly authenticating this user by way of a mobile terminal.

2. PRIOR ART

When a user wishes to access a service provided via the Internet using any consultation terminal, this service may make access conditional on the user being authenticated with a certain security level.

The Global System for Mobile Communications (GSMA) has proposed, by way of its "Mobile Connect" solution, an authentication method based on the mobile terminal of the user, based inter alia on the security module, called SIM card, with which the mobile terminal is equipped.

In this method, what is called a discovery server asks the user to enter the number of his mobile terminal, that is to say his MSISDN number (Mobile Station International Subscriber Directory Number), on his consultation terminal. The discovery server then transmits a message to the service provider allowing it to trigger a request to authenticate the mobile terminal with its operator. If the authentication is successful, the operator indicates information to the service provider that the authentication has succeeded.

When the mobile terminal is also the consultation terminal, it is desirable to avoid asking the user to enter his MSISDN number, in order to improve ease of use and speed of access to the requested service. However, the applications installed on a mobile telephone do not have access to its MSISDN number, thereby making it impossible to extract and send this number to the discovery server without the user intervening.

It is also desirable for the authentication method not to depend on personal data that are stored or not stored in the mobile terminal or in the SIM card.

One of the aims of the invention is to rectify these drawbacks from the prior art.

3. DISCLOSURE OF THE INVENTION

The invention aims to improve the situation by way of a method for accessing a service provided on a mobile terminal by a server contributing to providing the service, called application server, the method being implemented by the mobile terminal and comprising the following steps:

- sending a request comprising an identifier of a subscriber to a subscription with a mobile operator, called identifier of the subscriber, the identifier of the subscriber being based on information provided by a security module of the mobile terminal, and inserted into the request without the user intervening;
- receiving a response comprising information relating to the identifier of the subscriber, called identification code;
- sending an authentication request comprising the identification code, the request being sent to an authentication server of the mobile operator;
- receiving an authentication response comprising information relating to the identification code, called authentication code;
- sending a request to access the service comprising the authentication code, the request being sent to the application server.

The security module of a mobile terminal, also known under the name SIM card, does not contain the MSISDN number of the mobile terminal, but it comprises identifiers allowing an operator to uniquely identify the subscriber to a subscription. The correspondence between such a subscriber identifier, for example the number called IMSI (International Mobile Subscriber Identity) number and the MSISDN number is known only to the mobile operator responsible for the subscription. The IMSI number consists of an MCC (Mobile Country Code) portion for identifying the registered country of the operator, an MNC (Mobile Network Code) portion for identifying the operator itself, and an MSIN (Mobile Subscriber Identification Number) portion, assigned by the operator, allowing it to identify the subscriber to a subscription. Another example of an identifier able to be extracted from the SIM card and separate from the MSISDN number is the number called ICCID (integrated circuit card identifier).

As the IMSI or ICCID number is stored in the SIM card, it is able to be automatically extracted and transmitted in the message from the terminal, without the user having to know it, and without said user intervening, for example by way of an application integrated into the mobile telephone or into the SIM card. Thus, by virtue of the proposed method, the terminal is able to authenticate itself with its operator without the user being asked for any MSISDN, IMSI, ICCID or other number.

The subscriber identifier may also be a temporary number, for example the TMSI (Temporary Mobile Subscriber Identity) number, a random number assigned by the mobile network when the terminal attaches thereto with its IMSI number.

Sending two requests allows the mobile operator to process these separately, while complying with the separation between what is called a discovery phase (obtaining an authentication code) and what is called an authorization phase (accessing the service using the authentication code), and minimizes any modifications to the existing architecture of the authentication systems used by mobile operators.

It is thus not the identification code of the terminal that is communicated by the terminal to the application server in order to authorize it to provide the service to the terminal. Instead, an authentication code specific to the authentication request is generated as a result of the successful authentication of the terminal, and it is this authentication code that is communicated by the terminal to the application server in order to access the service.

According to one aspect, the method for accessing a service furthermore comprises the following steps, following the sending of the request comprising the identification code to the authentication server:

- receiving an authentication challenge request from the authentication server, requiring an action from the user of the mobile terminal on the terminal, sending an authentication challenge response to the authentication server, following the action performed on the terminal by the user.

It is possible to make access to the service for a mobile terminal conditional on the success of an authentication challenge controlled by the mobile operator of the terminal, in a manner completely transparent to the user, apart from the challenge itself, which requires an action from said user. Specifically, throughout the method, including the final step of accessing the service, the user never communicates an identifier liable to allow an entity other than the operator to identify the terminal. On the one hand, this provides the user with increased ease of use of the service and, on the other hand, this increases the security of the personal data of the user, which includes his telephone number or his subscriber identifier.

According to one aspect, the identification code is an identifier generated on the basis of an MSISDN telephone number associated with the security module of the mobile terminal, the telephone number being derived on the basis of the subscriber identifier.

The operator is the only one able to deduce the MSISDN number from the subscriber identifier, and also the only one able to recover the MSISDN number from the identification code.

According to one aspect, the identification code is a single-use identification code. The risk of the identification code being used if it has been intercepted by an entity other than the terminal or the operator is thus reduced.

According to one aspect, the validity of the identification code has a limited time. The risk of the identification code being used by an entity other than the terminal or the operator is thus reduced.

According to one aspect, the method for accessing a service furthermore comprises the following steps, prior to the step of sending an authentication request comprising the identification code to the second server:

sending a discovery request to the application server;
receiving a response from the application server, comprising at least one address of the second server.

Thus, if the address of the second server is not known to the terminal, it is able to obtain this by way of a request to the application server. The application server knows the address of a discovery server specific to the operator, and is thus able to obtain the address of an authentication server suitable for the type of service provided by the application server. It is this second server address that is given to the terminal.

According to one aspect, the identification code is an operator-encrypted version of an MSISDN telephone number assigned to the security module of the mobile terminal. Encrypting the MSISDN number is a simple solution allowing the mobile operator to communicate a version of this number to third-party entities, while at the same time being the only one able to deduce the original MSISDN number therefrom when it subsequently receives the encrypted version from one of these third-party entities.

The various aspects of the method for accessing a service that have just been described may be implemented independently of one another or in combination with one another.

The invention also relates to a device for accessing a service on a mobile terminal, contained in the mobile terminal and comprising:

a multimedia interface for the consumption of the service by a user on the mobile terminal,
a security module,
a transmitter able to send a request comprising an identifier of a subscriber to a subscription with a mobile operator, called identifier of the subscriber, the identifier of the subscriber being contained in the request and based on information provided by the security module without the user intervening;
a receiver able to receive a response comprising information relating to the identifier of the subscriber, called identification code;
a transmitter able to send an authentication request comprising the identification code to an authentication server of the mobile operator;
a receiver able to receive an authentication response comprising information relating to the identification code, called authentication code;
a transmitter able to send a request to access the service comprising the authentication code to an application server contributing to providing the service intended to be consumed by way of the multimedia interface.

This device, which is able to implement the method for accessing a service that has just been described in all of its embodiments, is intended to be implemented in a mobile terminal.

The invention also relates to a system comprising a mobile terminal equipped with an access device in accordance with the one that has just been described, an application server able to provide a service intended to be consumed by a user on the mobile terminal, an authentication server of a mobile operator able to submit an authentication challenge to the mobile terminal on the basis of a request received from the mobile terminal, and a discovery server able to provide an address of the authentication server on the basis of a request from the mobile terminal transmitted by the application server.

The invention also relates to a computer program comprising instructions for implementing the steps of the method for accessing a service that has just been described when this program is executed by a processor.

The invention also targets an information medium able to be read by a mobile terminal and containing instructions of a computer program as mentioned above.

This program may use any programming language and be in the form of source code, object code or intermediate code between source code and object code, such as in a partially compiled form, or in any other desirable form.

The abovementioned information medium may be any entity or device capable of storing the program. For example, a medium may contain a storage means, such as a ROM, for example a CD-ROM or a microelectronic circuit ROM, or else a magnetic recording means, for example a floppy disk or a hard disk.

On the other hand, an information medium may be a transmissible medium such as an electrical or optical signal, which may be routed via an electric or optical cable, by radio or by other means. The program may in particular be downloaded from an Internet network.

As an alternative, the information medium may be an integrated circuit in which a program is incorporated, the circuit being designed to execute or to be used in the execution of the method in question.

4. PRESENTATION OF THE FIGURES

Figure 2:
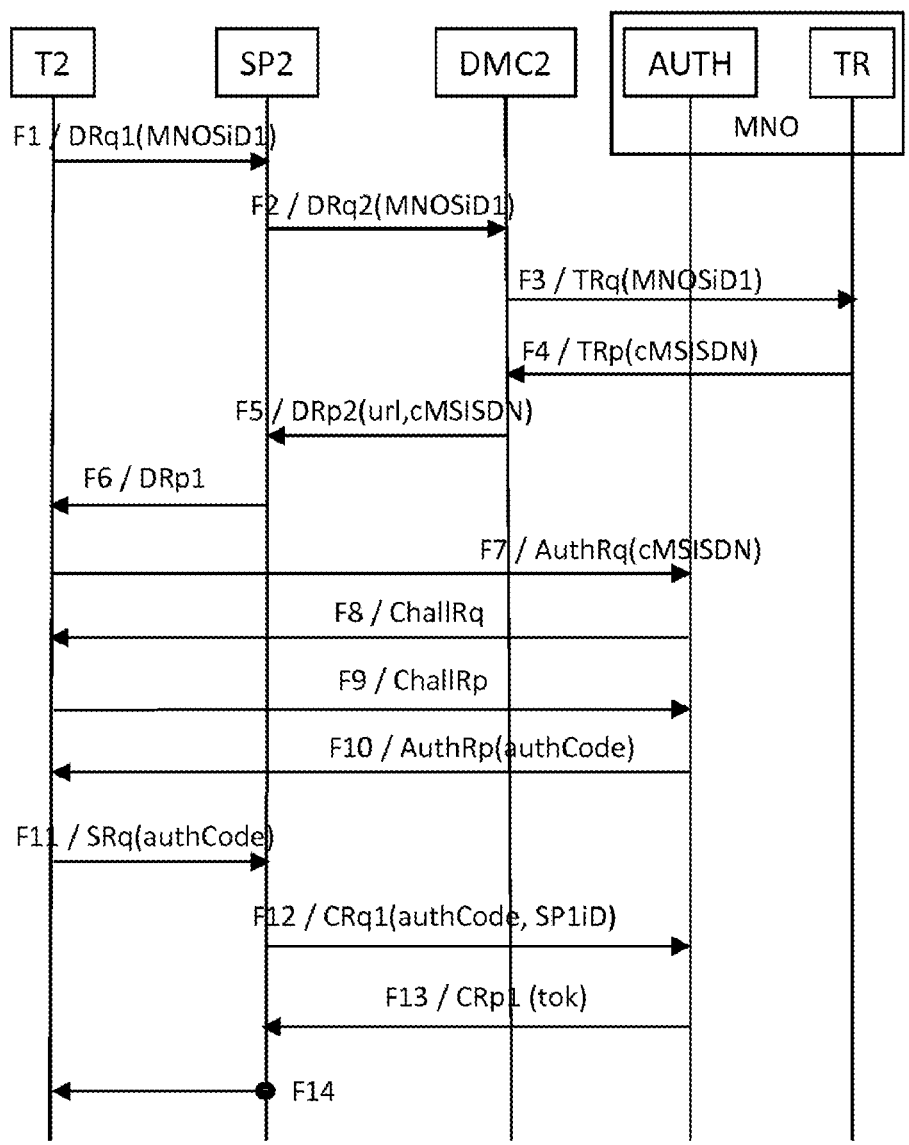
Figure 3:
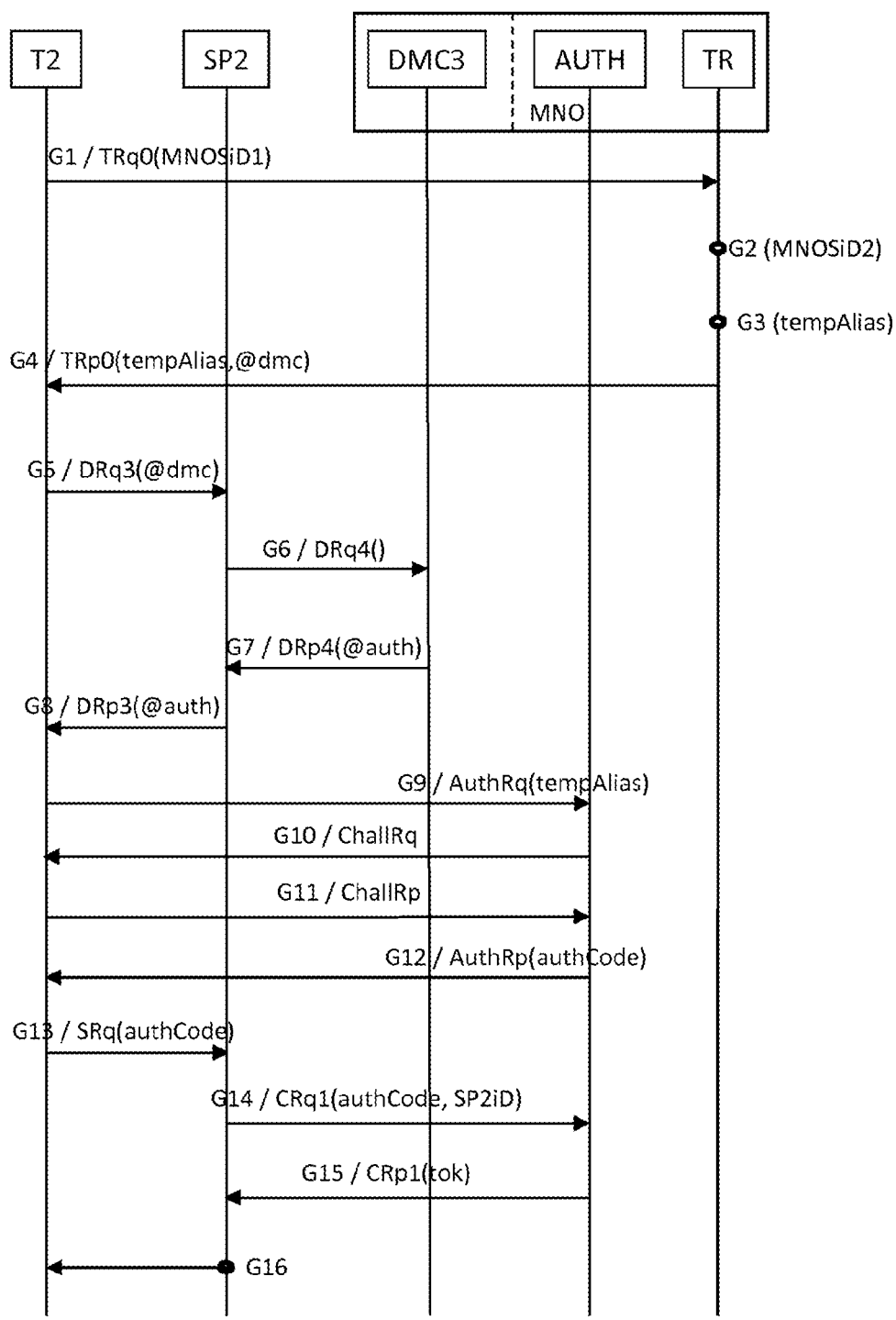
Figure 4:
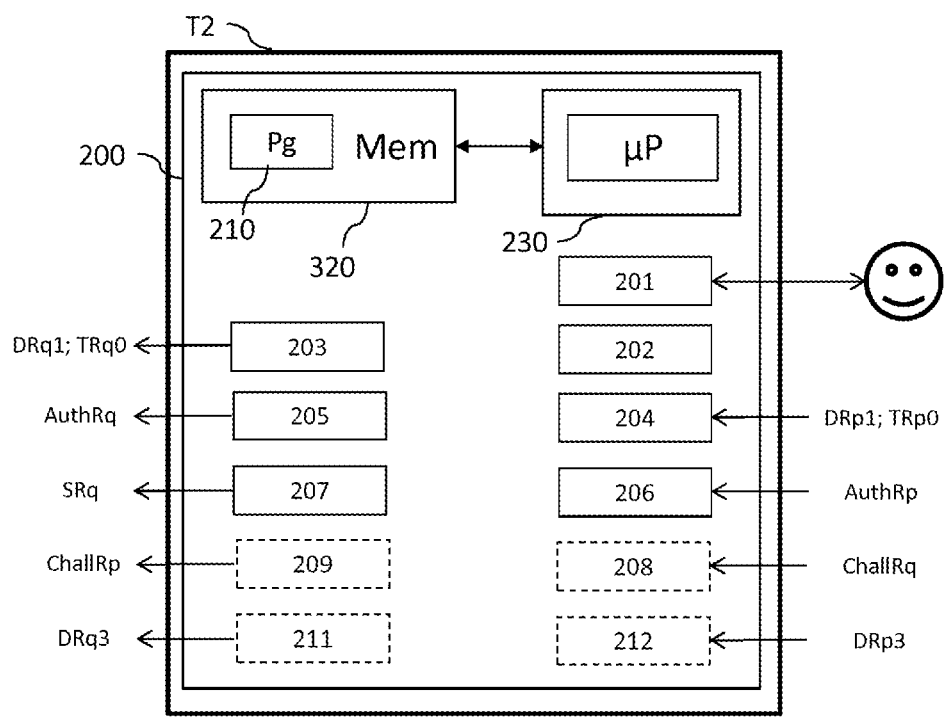

Other advantages and features of the invention will become more clearly apparent upon reading the following description of one particular embodiment of the invention, given by way of simple illustrative and nonlimiting example, and the appended drawings, in which:

FIG. 1 shows one exemplary implementation of a method for accessing a service provided on a mobile terminal, according to the prior art, FIG. 2 shows one exemplary implementation of a method for accessing a service provided on a mobile terminal, according to a first embodiment of the invention, FIG. 3 shows one exemplary implementation of the method for accessing a service provided on a mobile terminal, according to a second embodiment of the invention, FIG. 4 shows one exemplary structure of the device for accessing a service provided on a mobile terminal, according to some aspects of the invention.

5. DETAILED DESCRIPTION OF AT LEAST ONE EMBODIMENT OF THE INVENTION

FIG. 1 shows one exemplary implementation of a method for accessing a service provided on a mobile terminal, according to the prior art.

In this method, a user wishes to access, on his mobile terminal T1, a service provided by a server SP1 on a remote network, for example the Internet. He uses for example a browser or a dedicated application on his terminal T1 that allows him for example to display an interactive website if the service is rendered in the form of a website, but other formats for delivering the service on the terminal T1 may be contemplated.

The delivery of the service is conditional on the user being authenticated by way of the terminal, for example using the method known under the name "Mobile Connect". The following steps describe this method.

Steps E1 to E5 form part of a discovery phase prior to the authentication, and steps E6 to E9 form part of an authentication phase.

In a step E1, the terminal T1 sends a request DiscRq1, called discovery request, to the server SP1, intended to trigger the use of the Mobile Connect method in the server SP1 in order to authenticate the user.

In a step E2, the server SP1 sends a request DiscRq2, also called discovery request, to a server, called discovery server DMC1, intended to trigger the activation of the Mobile Connect method in the server DMC1.

In a step E3, the server DMC1 sends a request NumRq to the terminal T1, intended to recover the MSISDN mobile telephone number of the terminal T1.

In a step E4, the user enters the MSISDN number of the terminal on his terminal T1, for example by hand on the touchscreen of the terminal, and the terminal sends a response NumRp to the server DMC1, comprising the MSISDN number.

Through prior agreements between the entity managing the Mobile Connect platform and mobile operators, the server DMC1 is able to make the link between an MSISDN number and one of these mobile operators. For example, either the server DMC1 has a correspondence table between MSISDN numbers and addresses of authentication servers of mobile operators in memory, or it interrogates a special server.

In a step E5, the discovery server DMC1 sends a response DiscRp2, called discovery response, to the application server SP1, comprising an address of an authentication server specific to the mobile operator MNO managing the subscription associated with the MSISDN number of the terminal T1, for example a URL address, and a parameter cMSISDN, which is an encrypted version of the MSISDN number, so that the MSISDN number is not revealed while it is being transported, in particular to the service provider managing the application server SP1. The server DMC1 uses an encryption means known to the mobile operator MNO to encrypt the MSISDN number, for example using a public key provided beforehand by the mobile operator MNO.

In a step E6, the discovery server DMC1 transmits the response DiscRp1, which comprises the same content as the response DiscRp2, to the terminal T1.

The messages DiscRq1, DiscRq2, NumRq, NumRp, DiscRp2 and DiscRp1 may form part of the same application session, for example an http session, or form part of one and the same string of http requests/responses, stored by the server SP1.

In a step E7, using the address obtained in step E6, the terminal T1 sends a request AuthRq, called authentication request, to the authentication server AUTH of the mobile operator MNO, comprising the encrypted version of the MSISDN number. As it forms part of the domain of the operator MNO that encrypted the MSISDN number, the server AUTH possesses the decryption means, for example the private key corresponding to the abovementioned public key, and recovers the MSISDN in plaintext form.

In a step E8, the server AUTH sends a request ChallRq, called challenge request, to the terminal T1, the purpose of which is to ask the user of the terminal T1 for proof of his right or of his consent to use the requested service.

This request and its response are for example SMS messages.

In a step E9, the user of the terminal T1 responds to the challenge. For example, depending on the choice made by the service provider or the mobile operator MNO with regard to the Mobile Connect method, in the case of a strong authentication, the user may be asked to enter a personal code, specific to Mobile Connect, for example a string of alphanumeric characters. In the case of a weak authentication, the user may simply be asked to confirm reception of the request ChallRq on the terminal T1. The action of the user is for example verified by the SIM card, which certifies it if it is correct. Following the action of the user, a response ChallRp, called response to the challenge, is sent by the terminal T1 to the authentication server AUTH. This response does not contain the code entered by the user, but contains the certification performed by the SIM card of the conformity of the action of the user. The server AUTH verifies the certification and possibly the fact that it has received the response ChallRp within a given time.

As the expected result of the challenge, the authentication server AUTH obtains both the authentication of the terminal T1 and the consent from the user of the terminal T1 for the use that will be made of the authentication, that is to say the provision of a service to the terminal T1 by the server SP1.

If this verification by the server AUTH is positive, the server AUTH, in a step E10, sends a response AuthRp, called authentication response, to the terminal T1, in response to the request AuthRq sent in step E7, comprising an authentication code authCode. This authentication code is not enough for the terminal T1 to obtain the requested service from the server SP1, but if the terminal T1 transmits it to the server SP1, it allows the server SP1 to obtain, from the authentication server AUTH, proof of the right of the terminal T1 to obtain the service and an identification of the client behind the user of the terminal T1. For security purposes, this proof is not directly entrusted to the terminal T1 by the server AUTH.

The authentication messages AuthRq and AuthRp are linked to the discovery messages DiscRq1, DiscRq2, NumRq, NumRp, DiscRp2 and DiscRp1, either by virtue of belonging to one and the same http session or by the messages being chained to one another and stored by the terminal T1. If it has several ongoing application sessions, the terminal T1 therefore knows exactly that application session to which the authentication response received in step E10 corresponds.

In a step E11, the terminal T1 sends a service request SRq to the server SP1, which may be a transfer of the response AuthRp, comprising the authentication code authCode.

In a step E12, the server SP1 verifies the right of the terminal T1 to obtain the service by sending, to the server AUTH, a request CRq1 comprising the authentication code authCode and an identifier SP1iD of the server SP1 that is known to the operator MNO. The identifier SP1iD may comprise an identifying portion so to speak, and a password portion specific to the server SP1, so as to allow the server AUTH to identify the server SP1 with a certain security level. The server SP1 obtained the address @auth of the server AUTH for example by way of the response DiscRp2 in step E5.

In a step E13, the server AUTH recovers the authentication code authCode and the identifier SP1iD, and verifies the identity of the server SP1. If the authentication code authCode and the identifier SP1iD are correct, the server AUTH provides a token tok that is the proof of the right of the terminal T1 to obtain the service, which proof is long-term and unique to the user of the terminal T1 for the service provided by the server SP1, and sends a response CRp1 comprising the token tok to the server SP1.

In a step E14 triggered by virtue of the token tok received in step E13, the server SP1 begins to deliver the service to the terminal T1, with the service features to which the user has the right.

FIG. 2 shows one exemplary implementation of the method for accessing a service provided on a mobile terminal, according to a first embodiment of the invention.

The delivery of the service is conditional on the user being authenticated by way of the terminal, using a method different from the method from the prior art presented with reference to FIG. 1. The following steps describe this novel method which, in contrast to the method from the prior art, does not require the user to enter a number on the terminal in order to identify the terminal, whether this be the MSISDN number or any other number.

Steps F1 to F6 form part of a discovery phase for obtaining an identifier for the authentication phase, and steps F7 to F10 form part of the authentication phase. The authentication phase makes it possible to obtain a code for the phase of accessing the service, and steps F11 to F14 form part of the phase of accessing the service.

In a step F1, the terminal T2 sends a request DRq1, called discovery request, to the server SP2, intended to trigger the use of the proposed authentication method in the server SP2 in order to authenticate the user. In contrast to the prior art, the request DRq1 comprises an identifier MNOSiD1, called subscriber identifier, provided by the SIM card of the terminal T2, or based on information provided by the SIM card. The identifier MNOSiD1 allows an operator to uniquely identify the subscriber to a subscription, like the MSISDN number, but is not the MSISDN number.

This subscriber identifier MNOSiD1 is for example the IMSI number stored in the SIM card of the terminal T2, which consists of an MCC (Mobile Country Code) portion for identifying the registered country of the operator, an MNC (Mobile Network Code) portion for identifying the operator itself, and an MSIN (Mobile Subscriber Identification Number) portion, assigned by the operator and different from the MSISDN number, allowing it to identify the user as a subscriber to a subscription. As it is stored in the SIM card, it is possible for the terminal T2 to insert the IMSI number into the request DRq1 without the user intervening. Step F1 therefore comprises a sub-step of extracting the IMSI number from the SIM card, and a sub-step of inserting the IMSI number into the request DRq1. Known APIs (Application Programming Interfaces) allow an application executed on a mobile telephone to recover some of this information stored in a SIM card, such as the IMSI number.

More generally, this subscriber identifier may be any number for identifying a user, or both the user and his mobile operator, without it being possible for an entity other than this operator to deduce the MSISDN number therefrom. The subscriber identifier may be stored in the SIM card, or generated for step F1 on the basis of information provided by the SIM card, such as for example the TMSI number generated on the basis of the IMSI number.

In a step F2, the server SP2 sends a request DRq2, also called discovery request, to a server, called discovery server DMC2, intended to trigger the activation of the proposed authentication method in the server DMC2. The request DRq2 also comprises the subscriber identifier MNOSiD1 inserted by the terminal T2 without the user intervening.

In a step F3, the server DMC2 sends a request TRq, called translation request, to a translation function TR able to provide an encrypted version of the MSISDN number on the basis of a subscriber identifier. Instead of an encrypted version of the MSISDN number, this may alternatively be any encrypted or unencrypted number or code that allows the mobile operator receiving it to recover the MSISDN number that it needs in order to send a challenge request to the terminal T2 in step F7, and that conceals the MSISDN number from any entity other than the mobile operator. The request TRq comprises the identifier MNOSiD1, and the function is hosted in an equipment controlled by the operator, such as for example the authentication server AUTH of the mobile operator. The discovery server DMC2 obtains the address of this equipment and/or of this translation function TR either by virtue of a correspondence table between MCC/MNC numbers (contained for example in the identifier MNOSiD1) and addresses of translation functions of mobile operators, or by interrogating a special server. The translation function TR and the authentication server AUTH may also form just a single server.

Alternatively, the request TRq may comprise an identifier of the subscriber without the MCC/MNC numbers, these not being necessary for the translation function discovered by the discovery server DMC2 just by way of these numbers.

In a step F4, the function TR sends a response TRp, called translation response, to the server DMC. This response comprises a parameter cMSISDN, which is a version of the MSISDN number encrypted by the mobile operator, so that the MSISDN number is not revealed either to the service provider managing the application server SP2 or to the entity managing the discovery server DMC or to any entity other than the mobile operator. This is an additional advantage of the proposed method over the prior art, in which the entity managing the discovery server DMC2, that is to say the entity managing the Mobile Connect platform, may know the MSISDN number of any user terminal.

Through prior agreements between the entity managing the discovery server DMC2 and mobile operators, the server DMC2 is able to make the link between an MCC/MNC number and one of these mobile operators. For example, either the server DMC2 has a correspondence table between MCC/MNC numbers and addresses of authentication servers of mobile operators in memory, or it interrogates a special server. The correspondence table may be the same as the one mentioned with respect to step F3 if the translation function and the authentication server are one unit.

In a step F5, the discovery server DMC2 sends a response DRp2, called discovery response, to the application server SP2, comprising an address of an authentication server specific to the mobile operator identified by the MCC/MNC number, for example a URL address, and the parameter cMSISDN received in the response TRp of step F4.

In a step F6, the discovery server DMC2 transmits the response DRp1, which comprises the same content as the response DRp2, to the terminal T2.

The messages DRq1, DRq2, DRp2 and DRp1 may form part of the same application session, for example an http session, or form part of one and the same string of http requests/responses, stored by the server SP2.

Steps F7 to F14 are respectively identical to steps E7 to E14 described with reference to FIG. 1, and will not be described again.

In one variant of this first embodiment that is not illustrated, steps F3 and F4 are omitted, as is the translation server TR.

In a step F1' that replaces step F1, the terminal T2 sends a request DRq1' to the server SP2, comprising not the subscriber identifier MNOSiD1 but only the MNC/MCC identifiers of the terminal T2. These identifiers uniquely identify the server MNO.

In a step F2' that replaces step F2, the server SP2 sends a discovery request DRq2' to the discovery server DMC2, intended to trigger the activation of the proposed authentication method in the server DMC2.

In a step F5' that replaces step F5, the server DMC2 sends a discovery response DRp2' to the server SP2, comprising the address of the server AUTH, but without the parameter cMSISDN. The MNC/MCC identifiers are enough for the server DMC2 to determine the address of the correct authentication server corresponding to the operator MNO.

In a step F6' that replaces step F6, the server SP2 sends a discovery response DRp1' to the terminal T2, with the same content as the response DRp1', comprising the address of the server AUTH, but without the parameter cMSISDN.

In a step F7' that replaces step F7, the terminal T2 sends an authentication request AuthRq to the server AUTH, comprising the subscriber identifier MNOSiD1 instead of the parameter cMSISDN.

In this variant, there is no need for a translation function, but the authentication server AUTH has to be capable of recovering the MSISDN number essential to steps F8 and F9 of the challenge, on the basis of a message from the terminal T2 comprising the subscriber identifier.

Advantageously, in this variant, the subscriber identifier does not pass via the server SP2, which is not a server of the domain of the mobile operator MNO and is therefore not as reliable as the authentication server.

FIG. 3 shows one exemplary implementation of the method for accessing a service provided on a mobile terminal, according to a second embodiment of the invention.

Advantageously, in this embodiment, the server SP2 does not have access to any subscriber identifier specific to the operator MNO and stored in the SIM card of the terminal T2, such as the IMSI number for example.

Steps G1 to G8 form part of a discovery phase for obtaining an identifier for the authentication phase, and steps G9 to G12 form part of the authentication phase. The authentication phase makes it possible to obtain a code for the phase of accessing the service, and steps G13 to G16 form part of the phase of accessing the service.

In a step G1, the terminal T2 sends a request TRq0, called translation request, to a translation function TR of the mobile operator.

In contrast to the prior art, the request TRq0 comprises an identifier MNOSiD1, called subscriber identifier, provided by the SIM card of the terminal T2, or based on information provided by the SIM card. The identifier MNOSiD1 allows an operator to uniquely identify the subscriber to a subscription, like the MSISDN number, but is not the MSISDN number.

The translation function TR is able to provide, on the basis of the identifier MNOSiD1 associated with the user as subscriber to the mobile operator, for example an IMSI (International Mobile Subscriber Identity), TMSI (Temporary Mobile Subscriber Identifier) or ICCID (Integrated Circuit Card Identifier) number, an identification code tempAlias that allows the mobile operator that subsequently receives it to recover an identifier MNOSiD2 that it needs in order to send a challenge request to the terminal T2 in step G10, for example the MSISDN number. This identification code tempAlias conceals the MSISDN number from any entity other than the mobile operator. The request TRq0 comprises the identifier MNOSiD1, and the function TR is hosted in an equipment controlled by the operator, such as for example the authentication server AUTH of the mobile operator. The translation function TR and the authentication server AUTH may also form just a single server.

The address of this translation function TR may be provided to the terminal T2 in several ways. In a first way, the address is provisioned in advance in the terminal T2, by the provider of the operating system installed on the terminal T2, or in the SIM card by the mobile operator MNO. In a second way, steps G5 to G8 described below may have been performed before step G1, and their result may have been stored in memory by the terminal T2. This result includes the address of the authentication server AUTH, but may also include the address of the translation function TR if this is different.

In a step G2, the translation function TR recovers another identifier MNOSiD2 of the subscriber, for example the MSISDN number of the terminal T2, from the identifier MNOSiD1.

In a step G3, the translation function TR generates the identification code tempAlias associated with the identifier MNOSiD2. This identification code is a single-use identification code intended to be consumed by the authentication server AUTH in a subsequent step G9. This identification code may have a limited lifetime, for example 5 minutes, that is to say that it is no longer possible for the authentication server AUTH to recover the identifier MNOSiD2, for example the MSISDN number, from the identification code tempAlias after the 5 minutes have elapsed.

In a step G4, the function TR sends a response TRp0, called translation response, to the terminal T2. This response comprises the identification code tempAlias and an address @dmc of a discovery server DMC3, which may be a server of the domain of the mobile operator MNO or outside its domain.

The requests and responses G1 to G4 may use the https protocol for example.

In a step G5, the terminal T2 sends a request DRq3, called discovery request, to the server SP2, intended to discover an authentication server associated with the mobile operator MNO. The request DRq1 comprises the address @dmc of the discovery server DMC3 of the mobile operator that the terminal T2 obtained in step G4.

In a step G6, the server SP2, using the address @dmc, sends a request DRq4 to the discovery server DMC3 of the mobile operator, the purpose of which is to obtain an address @auth of an authentication server AUTH of the mobile operator in response.

In a step G7, the discovery server DMC3 sends a response DRp4 to the server SP2, comprising the address @auth of the authentication server AUTH obtained by the discovery server DMC3.

In a step G8, the server SP2 transmits the response DRp2 to the terminal T2.

The address @auth may be an address from a list of addresses contained in the response DRp2, each of which contains text corresponding to a given use. The terminal T2 may select a particular address from this list on the basis of the type of service that it expects from the server SP2.

Steps G6 and G7 allow the server SP2 to obtain the address @auth. Steps G5 and G8 allow the terminal T2 to obtain the address @auth. In one variant, with the address @auth being a stable address, one or the other of these two groups of steps may be executed prior to step G1, and their result (the address @auth) stored by the terminal T2 and/or the server SP2.

In a step G9, in which the authentication phase begins, using the address @auth obtained in step G8, the terminal T2 sends a request AuthRq, called authentication request, to the authentication server AUTH of the mobile operator managing the subscription of the terminal T2, comprising the identification code tempAlias generated by the function TR in step G3 from the subscriber identifier MNOSiD2. As the server AUTH and the function TR form part of the domain of the operator MNO, the server AUTH possesses the means for recovering the subscriber identifier MNOSiD2 on the basis of the identification code tempAlias, on the condition that said identification code has not already expired. The server AUTH then marks the identification code tempAlias as having expired. The authentication code tempAlias may already have expired for two reasons: either it has already been used for the same purposes by the authentication server and presenting it again is then symptomatic of attempted fraud, or its lifetime has been reached, for example due to challenging transport conditions or an overloaded intermediate equipment.

In step G10, with the identification code tempAlias, the server AUTH recovers the identifier MNOSiD2 and uses it to send the challenge ChallRq by way of an SMS message if for example the identifier MNOSiD2 is the MSISDN number of the terminal T2, or by way of a notification using an infrastructure specific to the provider of the operating system of the terminal T2, for example GCM on Android or APNS on iOS.

Steps G11 to G16 do not differ from steps E9 to E14 described with reference to FIG. 1.

With reference to FIG. 4, one exemplary structure of the device for accessing a service provided on a mobile terminal according to some aspects of the invention is now presented.

The device 200 for accessing a service implements the method for accessing a service, various embodiments of which have just been described.

Such a device 200 may be implemented in a mobile terminal T2 on which the service is intended to be consumed.

For example, the device 200 comprises a processing unit 230 equipped for example with a microprocessor µP and driven by a computer program 210, stored in a memory 220 and implementing the access method according to the invention. On initialization, the code instructions of the computer program 210 are for example loaded into a RAM memory before being executed by the processor of the processing unit 230.

The device 200 also comprises:
- a multimedia interface 201 configured for the consumption of the service by a user on the mobile terminal,
- a security module 202,
- a transmitter 203 able and configured so as to send a request DRq1 or TRq0 comprising an identifier of a subscriber to a subscription with a mobile operator MNO, called identifier of the subscriber MNOSiD1, the identifier of the subscriber being contained in the request DRq1 or TRq0 and based on information provided by the security module 203 without the user intervening;
- a receiver 204 able and configured so as to receive a response DRp1 or TRp0 comprising information relating to the identifier of the subscriber MNOSiD1, called identification code cMSISDN or identification code tempAlias;
- a transmitter 205 able and configured so as to send an authentication request AuthRq comprising the identification code cMSISDN or the identification code tempAlias to an authentication server AUTH of the mobile operator MNO;
- a receiver 206 able and configured so as to receive an authentication response AuthRp comprising information relating to the identification code cMSISDN or to the identification code tempAlias, called authentication code authCode;
- a transmitter 207 able and configured so as to send a request to access the service SRq comprising the authentication code authCode to an application server SP2 contributing to providing the service intended to be consumed by way of the multimedia interface 201.

Advantageously, the device 200 also comprises:
- a receiver 208 able and configured so as to receive an authentication challenge request ChallRq from the authentication server AUTH, requiring an action from the user of the mobile terminal on the terminal;
- a transmitter 209 able and configured so as to send an authentication challenge response ChallRp to the authentication server AUTH, following the action performed on the terminal by the user;
- a transmitter 211 able and configured so as to send a discovery request DRq3 to the application server SP2;
- a receiver 212 able and configured so as to receive a response DRp3 from the application server SP2, comprising at least one address @auth of the second server AUTH.

The transmitters 203, 205, 207, 209 and 211 may be grouped together into one or more transmitters. Likewise, the receivers 204, 206, 208 and 212 may be grouped together into one or more receivers.

The entities described with reference to FIG. 4 may be hardware-based or software-based. FIG. 4 illustrates only some particular ways from among many possible ones of implementing the algorithm described above with reference to FIGS. 2 and 3. Specifically, the technique of the invention is applied indiscriminately to reprogrammable computing machines (a PC computer, a DSP processor or a microcontroller) executing a program comprising a sequence of instructions, or on dedicated computing machines (for example a set of logic gates such as an FPGA or an ASIC or any other hardware module).

If the invention is installed on reprogrammable computing machines, the corresponding programs (that is to say the sequences of instructions) may be stored in a removable storage medium (such as for example a floppy disk, a CD-ROM or a DVD-ROM) or non-removable storage medium, the storage medium being able to be read in part or in full by a computer or a processor.

The invention claimed is:

1. A method for accessing a service provided on a mobile terminal by a server contributing to providing the service, called an application server, the method being implemented by the mobile terminal and comprising the following acts:
   sending a translation request comprising an identifier of a subscriber to a subscription with a mobile operator, the identifier of the subscriber being based on information provided by a security module of the mobile terminal, and inserted into the translation request without the user intervening;
   receiving a translation response to the translation request, comprising information relating to the identifier of the subscriber, called an identification code, distinct from the information provided by the security module of the mobile terminal;
   sending an authentication request comprising the identification code, the authentication request being sent to an authentication server of the mobile operator;
   receiving an authentication response to the authentication request, comprising information relating to the identification code, called an authentication code; and
   sending a service request to access the service comprising the authentication code, the service request being sent to the application server.

2. The method for accessing a service as claimed in claim 1, comprising the following acts, following the sending of the authentication request comprising the identification code to the authentication server:
   receiving an authentication challenge request from the authentication server, requiring an action from the user of the mobile terminal on the terminal, and
   sending an authentication challenge response to the authentication server, following the action performed on the terminal by the user.

3. The method for accessing a service as claimed in claim 1, wherein the identification code is an identifier generated on the basis of an MSISDN telephone number associated with the security module of the mobile terminal, the telephone number being derived on the basis of the subscriber identifier.

4. The method for accessing a service as claimed in claim 1, wherein the identification code is a single-use identification code.

5. The method for accessing a service as claimed in claim 1, wherein validity of the identification code has a limited duration.

6. The method for accessing a service as claimed in claim 1, furthermore comprising the following acts, prior to the act of sending the authentication request comprising the identification code to the authentication server:
   sending a discovery request to the application server; and
   receiving a discovery response from the application server, comprising at least one address of the authentication server.

7. The method for accessing a service as claimed in claim 1, wherein the identification code is an operator-encrypted version of an MSISDN telephone number assigned to the security module of the mobile terminal.

8. A device for accessing a service on a mobile terminal, contained in the mobile terminal and comprising:
   a multimedia interface for consumption of the service by a user on the mobile terminal,
   a security module,
   at least one transmitter configured to send a translation request comprising an identifier of a subscriber to a subscription with a mobile operator, the identifier of the subscriber being contained in the translation request and based on information provided by the security module without the user intervening; and
   at least one receiver configured to receive a translation response to the translation request, comprising information relating to the identifier of the subscriber, called an identification code, distinct from the information provided by the security module of the mobile terminal;
   wherein the at least one transmitter is configured to send an authentication request comprising the identification code to an authentication server of the mobile operator;
   wherein the at least one receiver is configured to receive an authentication response to the authentication request, comprising information relating to the identification code, called an authentication code; and
   wherein the at least one transmitter is configured to send a service request to access the service comprising the authentication code to an application server contributing to providing the service intended to be consumed by way of the multimedia interface.

9. A system comprising:
   a mobile terminal equipped with a device for accessing a service, the device comprising:
      a multimedia interface for consumption of the service by a user on the mobile terminal,
      a security module,
      at least one transmitter configured to send a translation request comprising an identifier of a subscriber to a subscription with a mobile operator, the identifier of the subscriber being contained in the translation request and based on information provided by the security module without the user intervening; and
      at least one receiver configured to receive a translation response to the translation request, comprising information relating to the identifier of the subscriber, called an identification code, distinct from the information provided by the security module of the mobile terminal;
      wherein the at least one transmitter is configured to send an authentication request comprising the identification code to an authentication server of the mobile operator;
      wherein the at least one receiver is configured to receive an authentication response to the authentication request, comprising information relating to the identification code, called an authentication code; and
      wherein the at least one transmitter is configured to send a service request to access the service comprising the authentication code to an application server contributing to providing the service intended to be consumed by way of the multimedia interface,
   the application server configured to provide the service to be consumed by the user on the mobile terminal,
   the authentication server of the mobile operator configured to submit an authentication challenge to the mobile terminal on the basis of the authentication request received from the mobile terminal, and a discovery server configured to provide an address of the authentication server on the basis of either the translation request or a discovery request from the mobile terminal; transmitted by the application server.

10. A non-transitory computer-readable information medium able to be read by a mobile terminal and containing instructions of a computer program, which when executed by a processor of a device of the mobile terminal, configure the device to access a service provided on the mobile terminal by an application server contributing to providing the service, wherein the instructions configure the device to:

send a translation request comprising an identifier of a subscriber to a subscription with a mobile operator, the identifier of the subscriber being based on information provided by a security module of the mobile terminal, and inserted into the translation request without the user intervening;

receive a translation response to the translation request, comprising information relating to the identifier of the subscriber, called an identification code, distinct from the information provided by the security module of the mobile terminal;

send an authentication request comprising the identification code, the authentication request being sent to an authentication server of the mobile operator;

receive an authentication response to the authentication request, comprising information relating to the identification code, called an authentication code; and send a service request to access the service comprising the authentication code, the service request being sent to the application server.

* * * * *